United States Patent [19]

Goodwin et al.

[11] Patent Number: 4,502,006
[45] Date of Patent: Feb. 26, 1985

[54] DISPLACEMENT MEASURING TRANSDUCERS AND THEIR USE FOR SENSING VEHICLE SUSPENSION DISPLACEMENTS

[75] Inventors: Alan Goodwin, Birmingham; Malcolm Brearley, Solihull, both of England

[73] Assignee: Lucas Industries Limited, Birmingham, England

[21] Appl. No.: 539,631

[22] Filed: Oct. 7, 1983

Related U.S. Application Data

[63] Continuation of Ser. No. 256,783, Apr. 23, 1981, abandoned.

[30] Foreign Application Priority Data

Apr. 26, 1980 [GB] United Kingdom ............... 8013857
Apr. 8, 1981 [GB] United Kingdom ............... 8111023

[51] Int. Cl.³ ............... G01B 7/14; G01R 33/12; G01N 27/72
[52] U.S. Cl. ............... 324/208; 324/233; 324/234; 188/1.11; 336/130; 336/136; 180/167
[58] Field of Search ............... 324/206–208, 324/228, 233, 236, 234; 336/130, 136; 340/686, 665, 666, 52 R; 307/10 R; 73/570; 180/167; 280/707; 188/1.11, 267

[56] References Cited

U.S. PATENT DOCUMENTS

| | | | |
|---|---|---|---|
| 3,020,527 | 2/1962 | MacLaren | 340/870.32 |
| 3,488,578 | 1/1970 | Stigmark | 324/208 |
| 3,721,896 | 3/1973 | Mori et al. | 324/238 |
| 3,735,244 | 5/1973 | Gumtau et al. | 324/208 |
| 3,833,094 | 9/1974 | Grossman | 188/1.11 |
| 3,891,918 | 6/1975 | Ellis | 324/208 |
| 3,908,781 | 9/1975 | Oishi et al. | 324/179 X |
| 3,945,459 | 3/1976 | Oishi et al. | 73/517 R |
| 3,969,668 | 7/1976 | Weinzinger et al. | 324/234 X |
| 3,991,393 | 11/1976 | Becker, Jr. | 336/84 X |
| 4,054,295 | 10/1977 | Elliott | 280/707 |
| 4,112,365 | 9/1978 | Larson et al. | 324/207 |
| 4,230,987 | 10/1980 | Mordwinkin | 324/233 |
| 4,282,485 | 8/1981 | Pauwels et al. | 324/208 |
| 4,297,698 | 10/1981 | Pauwels et al. | 324/208 |
| 4,328,475 | 5/1982 | Clark | 336/136 |
| 4,350,954 | 9/1982 | Seilly | 324/208 |

FOREIGN PATENT DOCUMENTS

| | | | |
|---|---|---|---|
| 938087 | 9/1963 | United Kingdom | 324/217 |
| 1558206 | 12/1979 | United Kingdom | 324/208 |
| 2027207 | 2/1980 | United Kingdom | . |

*Primary Examiner*—Gerard R. Strecker
*Assistant Examiner*—Warren S. Edmonds
*Attorney, Agent, or Firm*—Scrivener Clarke Scrivener and Johnson

[57] ABSTRACT

An inductive displacement transducer is described in which the magnitude of the phase difference between A.C. current and voltage in a coil is dependent upon the axial displacement of a monitored object. The phase difference depends upon the axial position relative to the coil of a short-circuit turn which moves with the monitored object. A magnetic flux concentrator, which may be combined with the short circuit turn, enhances the flux linkage between the short-circuit turn and the coil. In order to sense the height of a vehicle suspension strut, the coil is mounted on a plastics dirt shield, the short-circuit turn is provided by a sleeve plated with an electrically conductive metal and secured to the strut cylinder. Various circuits are described for monitoring the height signals produced by the different suspension struts of a vehicle.

14 Claims, 7 Drawing Figures

DISPLACEMENT MEASURING TRANSDUCERS AND THEIR USE FOR SENSING VEHICLE SUSPENSION DISPLACEMENTS

This application is a continuation of Ser. No. 256,783, filed Apr. 23, 1981, now abandoned.

This invention relates to displacement measuring transducers, and is also concerned with the use of such transducers for sensing vehicle suspension displacements, in particular for sensing suspension height in vehicles provided with means for adjusting the vehicle height.

One aspect of the invention is concerned with the measurement of the phase relationship between voltage and current in an inductive displacement transducer, and stems from an appreciation of the fact that, under the right circumstances, this phase relationship can be made to vary progressively in dependence upon the position of the object being monitored.

A common form of inductive displacement transducer comprises a pair of axially aligned coils which are connected into respective arms of an A.C. bridge, and movement of a ferrite core from one coil to the other produces a voltage output of the bridge of which the magnitude can be arranged to be proportional to the displacement of the ferrite core. A typical arrangement is that disclosed in U.K. Patent Specification No. 1,059,029. Such an arrangement does not involve any measurements of phase, although, of course, it is usually necessary to employ a phase sensitive detector in such a bridge circuit to discriminate between the two components of the bridge output signal.

A displacement measuring transducer has also been proposed in U.K. Patent Specification No. 967581 in which the magnitude of a capacitor or of an inductance in a monitoring circuit is varied by movement of the monitored object, and the change is used to modify the resonant frequency of a tuned circuit by means of an inductive coupling between the monitoring circuit and the tuned circuit. The change in the resonant frequency brings about a change of phase in the voltage/current relationship of the tuned circuit which is measured by a phase discriminator, and the change in phase is a measure of the displacement of the monitored object. However, it will be appreciated that no measurement of the phase relationship between the voltage/current in the monitoring circuit was involved in that proposal. Also, such a circuit is not very suitable for use in arduous conditions which might affect the tuning of the tuned circuit.

According to one aspect of the invention a displacement measuring transducer comprises a coil, an A.C. source connected to the coil, a short-circuit turn which is movable relative to the coil in response to movement of a monitored object, a magnetic flux concentrator arranged to enhance the magnetic flux linking between the short-circuit turn and the coil, and means for measuring changes in the phase relationship between the voltage and current in the coil which result from the eddy currents produced in the short-circuit turn.

Such a transducer may be arranged to provide a substantially linear relationship between said phase and the displacement of the monitored object, and may be made of relatively cheap but durable construction.

The reason for the phase change will be understood if the transducer is considered in terms of a transformer in which the secondary is a movable short-circuit turn. It will be appreciated that the reflected resistance associated with the short-circuit turn, the effective shunt resistance across the primary, will vary with the degree of coupling between the coil and the short-circuit turn. As the short-circuit turn is moved towards a position in which the coupling between the short-circuit turn and the coil is increased the reflected resistance will be reduced, so that the current through the coil will tend to shift in phase towards that of the voltage across the coil.

The flux concentrator may be stationary relative to the coil or it may mounted for movement with the short-circuit turn.

The short-circuit turn of a displacement transducer in accordance with the invention is thus arranged to give rise to substantial eddy currents as compared with the eddy currents that are produced in displacement transducers used in conjunction with bridge circuits.

It has been found that there is an optimum value of the resistance of the short-circuit turn which, for any particular arrangement, provides the greatest phase shift per unit of displacement.

The optimum short circuit turn resistance is not in general the smallest obtainable value, but for a given arrangement can be found experimentally by winding a 'test' short-circuit turn with copper wire and terminating the ends with a variable resistor, which is then adjusted to achieve maximum phase shift. The measured resistance of this test short-circuit turn may then be used to determine the dimensions and material(s) to be used in the construction of the short-circuit turn.

Although the flux concentrator and the short-circuit turn may be constituted by two members of different materials, they may be constituted by a single member of a suitable electrically conductive and flux-concentrating material. A ferromagnetic material such as mild steel may then be used.

When two members are employed the flux concentrating member is preferably formed of a ferrite material or similar flux concentrating but electrically insulating material, and the short-circuit turn may be formed of a homogeneous material having a good electrical conductivity, such as copper.

Alternatively, the short-circuit turn may be a composite of two or more materials having different resistivities. For example, it may comprise a steel tube plated with copper or nickel to a predetermined thickness.

Although the short-circuit turn may comprise an auxiliary member which is attached to the member whose displacement is being monitored, the short-circuit turn may be constituted wholly or partially by an existing part of the monitored member.

In particular, the monitored member may comprise a vehicle suspension component, such as a tubular part of a suspension strut. The coil may then be mounted on a relatively fixed part of the strut and substantially coaxially of the relatively movable tubular part to sense movement of the tubular part. The tubular part will then act both as a flux concentrator and as a short-circuit turn.

When the coil is used in conjunction with a vehicle suspension strut it may conveniently be wound on an insulating sleeve, such as a plastics sleeve, fitted on a relatively fixed part of the strut. The plastics sleeve may also perform the function of a conventional dirt sleeve in shielding slidable parts of the strut from dirt.

Conveniently an electrically conductive sleeve is provided on the tubular part of the suspension strut to bring the short-circuit turn into close proximity to the coil. The conductive sleeve is conveniently of sufficient thickness and is made of or plated with a suitable material to optimise the short-circuit turn resistance. A smaller clearance between the coil and the short-circuit turn in general results in a greater sensitivity of the transducer.

In general applications of the invention, the short-circuit turn is preferably of tubular shape, and it may be provided with a base to form a cup with the base of the cup being connected to the monitored member.

When an independent flux concentrating member is employed that member is preferably mounted in the cup with part of the flux concentrating member projecting therefrom.

Although the phase relationship between the voltage and current in the coil is varied on displacement of the monitored object it can be arranged that the magnitude of the coil current does not vary substantially, as compared with many prior art transducers. This makes it possible to connect several coils in series or in parallel and use a common A.C. source without incurring serious mutual disturbances between the coils, and this is one factor which facilitates the application of the invention to a vehicle suspension sensing system where the different coils may be arranged individually to sense the displacement of respective suspension assemblies.

The use of series-connected measuring coils facilitates the use of a multiplex system for analysing voltage/current phase relationships of the coils.

Any suitable means may be employed for measuring changes in the coil voltage/current phase relationship. In a preferred arrangement, however, a comparator, which for convenience will be termed the 'measuring coil comparator', has its two inputs connected across the measuring coil, a reference impedance, which may be in the form of a resistor but is preferably in the form of an inductance, is connected in series with the measuring coil and A.C. source, and a further comparator which will be termed the 'reference comparator' has its two inputs connected across the reference impedance. The square wave outputs of the measuring coil comparator and of the reference comparator are fed to the respective inputs of a phase discriminator, preferably in the form of a further comparator, which will be termed the 'phase discriminating comparator', and the lengths of the pulses at the output of the phase discriminating comparator will correspond to the phase difference between the voltage/current relationship of the measuring coil and that of the reference impedance. The length of these pulses may be detected in any convenient manner.

In one preferred arrangement which enables multiplex analysis of the outputs of a plurality of measuring coils, the measuring coils are connected in series with a common reference impedance, respective measuring coil comparators are connected across the outputs of the measuring coils, and a multiplex selector switch is connected between the outputs of the measuring coil comparators for connecting the outputs of the measuring coil comparators in sequence to one input of a common phase discriminator of which the other input is permanently connected to the output of a reference impedance comparator connected across the reference impedance.

In order to reduce the number of comparators employed it is preferred, however, to use a selector switch assembly to connect the inputs of a common measuring coil comparator in sequence to the respective measuring coils.

In one such arrangement employng a common measuring coil comparator the measuring coils are arranged, as before, in series with one another and with the reference impedance, and the selector switch assembly comprises a respective double-pole analogue switch for each coil.

The use of double pole switches is avoided in another preferred arrangement in which each measuring coil is arranged in series with a respective single pole analogue switch of the selector switch assembly, and the series connected pairs of measuring coil and switch are connected in parallel with one another, and in series with a common reference impedance and the A.C. source. A common measuring coil comparator has one of its inputs connected to the junction between the connected ends of the measuring coils and its other input is selectively connected by the selector switches to the other ends of the respective measuring coils in sequence. In that arrangement the measuring coils are selectively connected to the A.C. source in turn by the selector switches.

Each of these preferred arrangements is particularly suitable for incorporation in a vehicle suspension height detecting system.

According to a second aspect of the invention a vehicle suspension system comprises a plurality of suspension assemblies, each adapted to be connected between sprung and un-sprung parts of a vehicle, a respective suspension height transducer associated with each suspension assembly to detect the height of the assembly, each transducer being arranged to provide a height signal which varies progressively with displacements of the respective suspension assembly, and a multiplex switch assembly connected between the transducers and a signal analysis circuit which is arranged sequentially to analyse the height from the different transducers.

The transducers may be transducers in accordance with the first aspect of the invention, but other suitable transducers may be employed.

The multiplex switch assembly and the signal analysis circuit may be incorporated in a central suspension height control unit.

The invention will now be further described, by way of example only, with reference to the accompanying drawings in which.

Figure 1A:
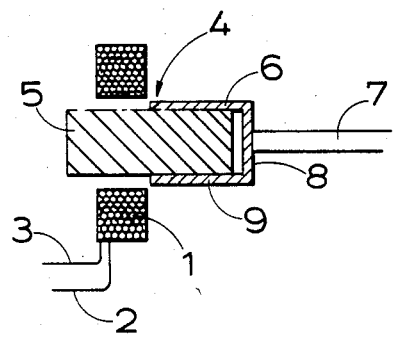
FIGS. 1a, 1b and 1c are longitudinal cross-sections of three measuring coil and core assemblies in accordance with the invention.

Referring to FIG. 1a, a conventional electrical coil 1 had leads 2 and 3 for connection to an A.C. source. A core assembly 4 coaxial with the coil is slidably mounted by suitable means, not shown, for axial movement relative to the coil and comprises a magnetic flux-concentrating solid cylinder 5 of ferrite material of which half of the length is secured, such as by bonding within a cup member 6 of a material having a relatively high electrical conductivity, such as copper. An actuating rod 7 of which the magnetic and electrical properties are not important is connected at one end by any convenient means to the base 8 of the cup member 6 and at its other end, not shown, to the member whose movement is to be monitored.

In the absence of the cup member 6 the introduction of the ferrite cylinder 5 into the coil 1 would bring about a substantial increase in the inductance of the coil 1 as seen by the A.C. source, but this would not substantially alter the phase relationship between the voltage and current in the coil since the ferrite material is a poor electrical conductor and only very limited eddy currents would be induced in the ferrite cylinder 5 which could provide any reflected resistance shunted across the coil. Thus the voltage in the coil would continue to lead the current in phase by substantially 90°, the coil being chosen to have a negligible resistance as compared to its inherent inductance. The cylindrical wall 9 of the cup member 6, however, provides a secondary coil in the form of a short-circuit turn of which the linkage with the coil 1 is varied on displacement of the core assembly 4. In FIG. 1a the open end of the cup member is shown about to enter the coil, so that displacement of the core assembly to the left, on leftward movement of the input rod 7, will increase the linking between the short-circuit turn and the coil 1 to induce substantial eddy currents in the wall 9. The effect of the eddy currents in the short-circuit turn is to reduce the expected rise in the inductance of the coil 1 resulting from insertion of the ferrite core 5 into the coil 1, and also to reduce the reflected resistance shunted across the coil 1. The reflected resistance will progressively decrease and the effective inductance of the coil 1 will progressively decrease as the core assembly 4 is displaced progressively leftwards from the position shown in FIG. 1a. This produces a progressive change in the phase relationship between the voltage and current in the coil 1 in the sense that the phase lag of the current relative to the voltage in the coil 1 is progressively reduced from an initial value of substantially 90°. The phase change is found to be substantially proportional to the displacement of the core assembly 4 over a useful range.

It will be appreciated that in the arrangement of FIG. 1a the base 8 of the cup member 6 is merely provided to effect a connection with the actuating rod 7, and that the characteristics of the device would be substantially unaltered if the cup member 6 were to be replaced by a tube of the same material.

Thus the assembly of FIG. 1a may be used to monitor the displacement of an object connected to rod 7 by monitoring in any convenient manner the phase relationship between the voltage and current in coil 1.

Figure 1B:
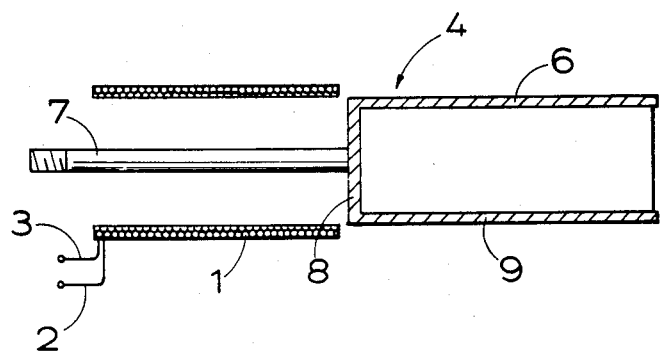

In the modified assembly of FIG. 1b corresponding reference numerals have been applied to corresponding parts. In this arrangement the composite core of the FIG. 1a assembly has been replaced by a unitary core 6 of ferro-magnetic, electrically conductive material, such as mild steel, which is of cup shape having a tubular side wall 9. A relatively elongate coil 1 has been shown in this case to demonstrate that the proportions of the coil may be varied over a wide range to suit the particular application. In general a longer coil will usually be required for monitoring larger displacements.

In this assembly the cup member 6 performs the dual functions of a magnetic flux concentrator and a short-circuit turn. In this case, however, the flux concentrator and the short-circuit turn enter the coil together, so that the effective inductance increases and the reflected resistance decreases during insertion of the cup member 6 into coil 1. Thus the effective impedance of the coil 1 does not vary substantially over the full range of movement of the cup member 6, and as previously mentioned this makes it possible to use the same A.C. source to energise several such coils without there being any serious mutual disturbances.

It will be appreciated that similar changes in the reflected resistance and effective impedance to those of the FIG. 1b construction would be achieved with the construction of FIG. 1a if that portion of the core 5 projecting from the cup 6 were to be removed.

It will also be appreciated that the cup member 6 of FIG. 1b may take the form of an existing component of a monitored member, such as the tubular body of a vehicle suspension strut.

Figure 1C:
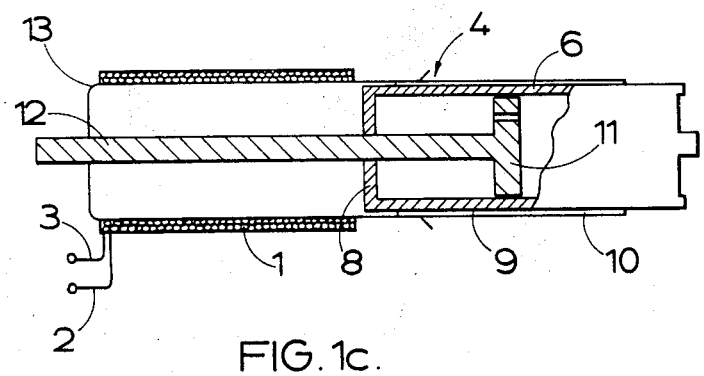
Figure 2:
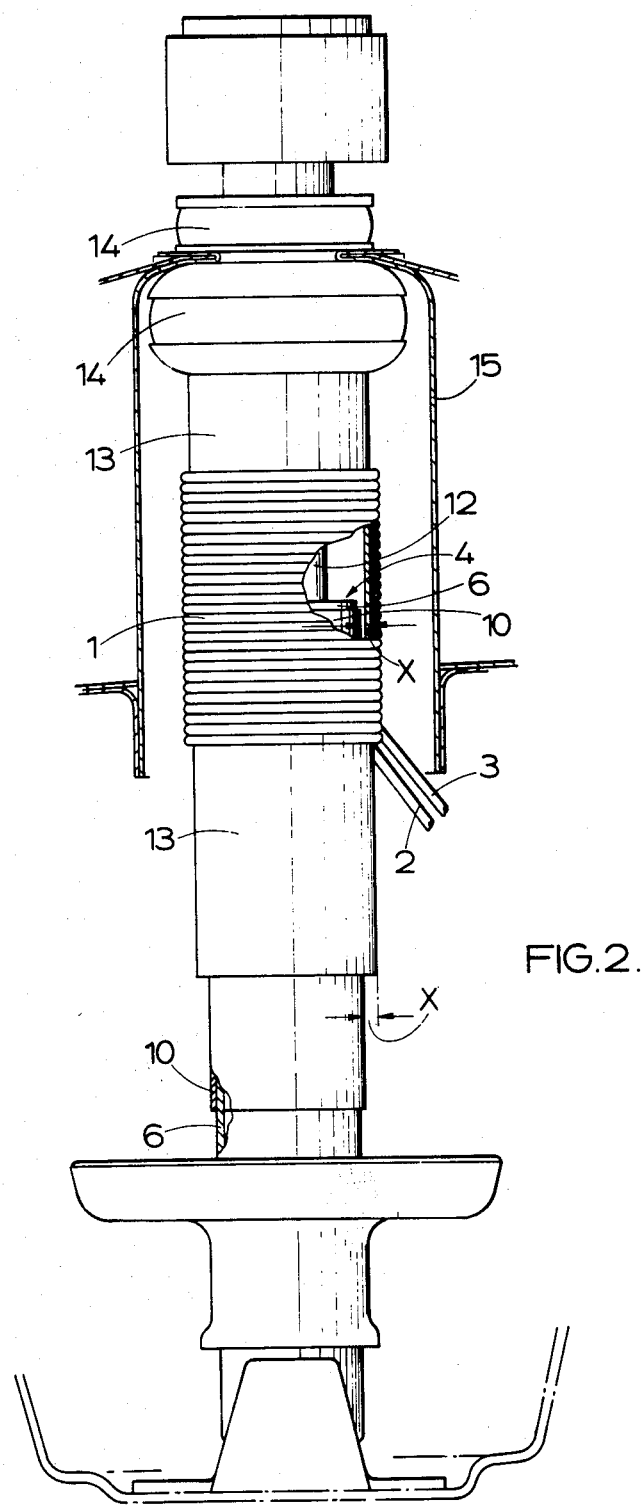
FIG. 2 is a side view of a vehicle suspension strut incorporating a similar measuring coil and core assembly to that of FIG. 1c.

FIG. 1c schematically shows the invention applied to a vehicle suspension strut and will be used to explain the principle of operation of the transducer incorporated in the suspension strut of FIG. 2. In FIG. 1c parts corresponding to those of FIG. 1b have been given corresponding reference numerals.

In the construction of FIG. 1c a stationary piston rod 12 carries a valved damper piston 11 which works in a movable damper cylinder 6. The piston rod 12 and the cylinder 6 are made of the usual materials, and therefore the rod 12 will act as a stationary flux concentrator whereas the cylinder 6 will act as a movable flux concentrator. A cup-shaped dirt shield 13 of insulating plastics materials has its base secured to the piston rod 12 and fixedly carries a coil 1.

Since the cylinder is of greater bulk and is closer to the coil than the piston rod 12, the effect on the coil current produced by movement of the cylinder 6 will be similar to the effect produced in the FIG. 1b arrangement by movement of cup member 6. In order to reduce the effect produced by the stationary piston rod, and therefore to reduce the dependence of the transducer characteristics on the diameter of the piston rod (which will vary from one vehicle to another) a mild steel sleeve 10 is pressed onto the cylindrical side wall 9 of the cylinder 6. The sleeve is plated with a suitable electrically conductive material, such as nickel or copper. Since the plated sleeve 10 and cylinder 6 act as the short-circuit turn, the effective resistance of the short-circuit turn may be carefully controlled by controlling the thickness of the plating.

FIG. 2 illustrates a conventional vehicle suspension strut assembly which has been modified to employ the transducer illustrated schematically in FIG. 1c, and corresponding reference numerals have been applied to corresponding parts. The suspension strut comprises a piston and cylinder assembly in which the piston rod 12 is secured at its upper end by rubber mounting bushes 14 to the top of a suspension turret 15 of a vehicle body, and a damper cylinder 6 is secured at its lower end to a wheel axle, not shown. The strut also incorporates conventional hydraulic means, not shown, for varying the hydraulic force applied to the piston in order to change the height of the suspension strut. For example, the piston rod 12 may be hollow to allow the volume of hydraulic fluid in the strut to be altered.

The operation of the strut is entirely conventional and it will be appreciated that upon an increase or a decrease in vehicle loading the strut respectively contracts or expands and the cylinder 6 moves into or out of the coil 1, such displacements being detected from the changes in phase relationship between the voltage and current in the coil 1.

The sleeve 10 takes up part of the clearance between the cylinder 6 and the dirt shield 13, and as the sleeve is electrically conducting it partly constitutes the short-circuit turn so that the clearance 'X' between the short-circuit turn and the sensing coil is made smaller thereby increasing the discrimination of the transducer. It is preferable to provide a sleeve on the cylinder rather than to use a dirt shield of smaller diameter for two reasons. Firstly it provides a convenient means of optimising the resistance of the short-circuit turn since the sleeve 10 can be made of a different material to that of the cylinder 6, or, if the sleeve 10 is to be plated, it is cheaper and more simple to plate a relatively small sleeve than it is to plate a relatively larger cylinder. Secondly the sleeve 10 maximises the radial distance between the sensing coil 1 and the exposed part of the piston rod 12. Different vehicle applications require different diameter piston rods, and it is found that large diameter piston rods can cause problems if the sensing coil responds too strongly to the rod, which of course, remains stationary relative to the dirt shield on which the coil is wound.

Figure 3:
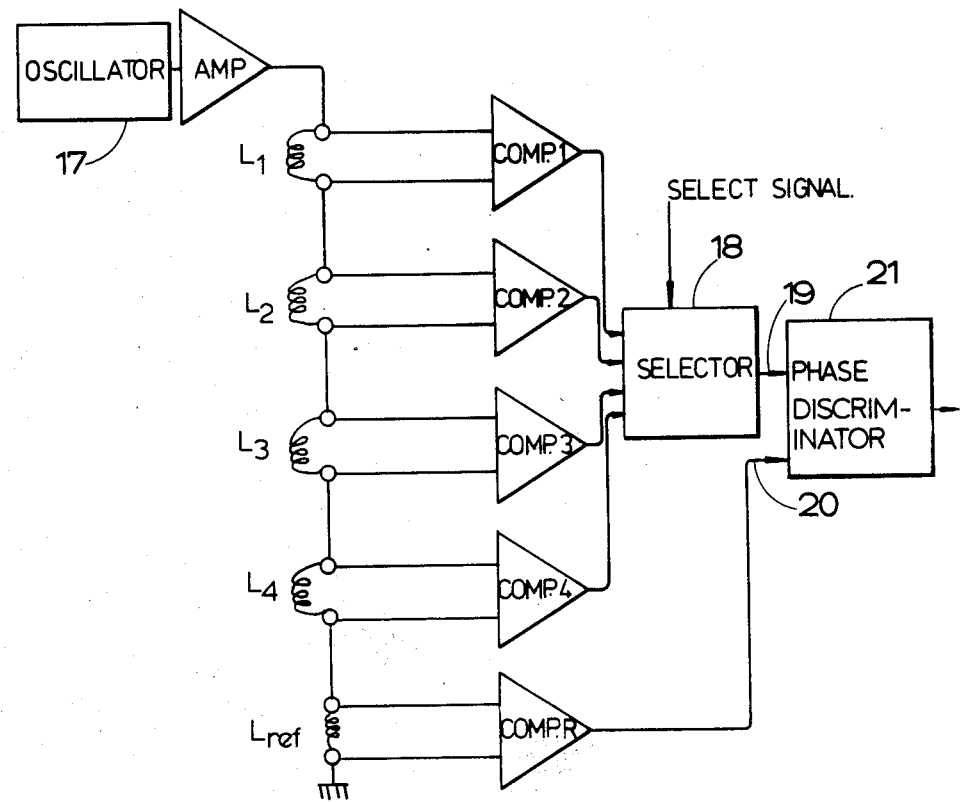
FIGS. 3 to 5 are block-circuit diagrams of three circuits in accordance with the invention for monitoring displacement of four members provided with respective measuring coils, such as vehicle suspension struts.

The circuit of FIG. 3 is applicable to the multiplex analysis of the current/voltage phase relationships in four measuring coils $L_1$, $L_2$, $L_3$ and $L_4$ associated with respective members whose displacements are to be monitored. The circuit is particularly applicable to the monitoring of suspension height in a vehicle provided with means for adjusting the suspension height to take account of changes in vehicle loading in order to improve the ride of the vehicle.

The measuring coils $L_1$ to $L_4$ may therefore each be associated with a respective suspension strut associated with a respective vehicle wheel in order to monitor the height changes of a part of each suspension strut.

As shown, the four measuring coils $L_1$ to $L_4$ are connected in series with one another and with a reference inductance $L_{ref}$ and they are fed with A.C. by an amplifier AMP from an oscillator 17. The frequency of the oscillator 17 is chosen such that any frequency drift will lead to a minimum change in the measured phase relationship of the voltage/current in the measuring coils. Measuring coil comparators COMP 1 to COMP 4 each have their inputs connected across the respective measuring coil $L_1$ to $L_4$ and their outputs are connected to a multiplex selector switch 18 which sequentially connects the output to one input 19 of a phase discriminator unit 21 of which the other input 20 is connected to the output of a reference comparator COMP R having its inputs connected across the reference inductance $L_{ref}$.

The output of each of the comparators COMP 1 to COMP 4 and COMP R wil be a square wave, since the comparators switch at the zero crossing points of the voltage waveform, but the relative phases of the square waves will differ. The phase discriminator 21 is arranged to compare the phase of a square wave from the output of one of the comparaors COMP 1 to COMP 4 in turn with the phase of the square wave from the output of COMP R. The phase discriminator 21 may comprise a further comparator having its two inputs connected respectively to inputs 19 and 20. The lengths of the pulses at the output of this comparator will then correspond to the phase difference between the voltage across the selected coil $L_1$ to $L_4$ and the voltage across the reference inductance $L_{ref}$, and this length may be measured in any convenient manner to provide a measurement of the height of the suspension strut associated with the selected coil. The measurements obtained may then be analysed by a suitable processor to determine what suspension control action is required. One or more cycles of the A.C. waveform may be monitored to provide the measured phase value.

Advantageously, the oscillator 17, amplifier, comparators COMP 1 to COMP 4 and COMP R, selector switch 18 and phase discriminator 21 are combined in a central monitoring unit. The reference inductance $L_{ref}$ may, if desired, be located in or adjacent to one of the suspension struts.

Figure 4:
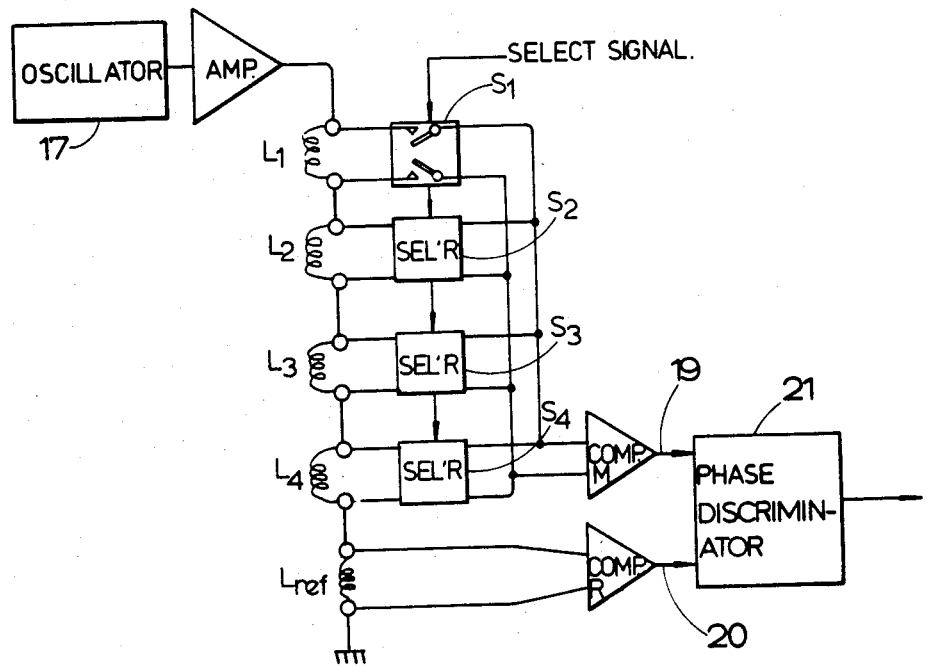

The circuit of FIG. 4 is similar to that of FIG. 3 except that a common measuring coil comparator COMP M is used instead of the four comparators COMP 1 to COMP 4, the selection function being performed by respective double-pole analogue switches $S_1$ to $S_4$ associated with the respective coils $L_1$ to $L_4$. The switches $S_1$ to $S_4$ are arranged to connect in turn the coils $L_1$ to $L_4$ respectively across the inputs of comparator COMP M.

Figure 5:
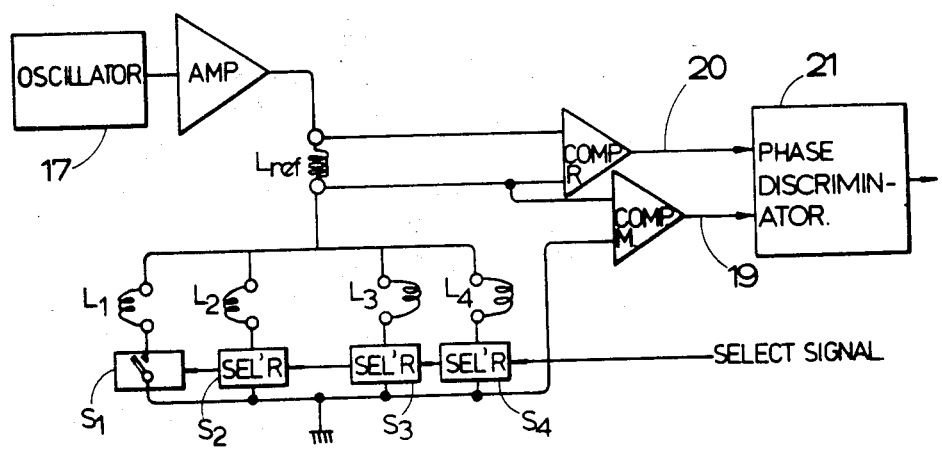

FIG. 5 shows a further modified circuit in which the measuring coils $L_1$ to $L_4$ are each arranged in series with a respective single pole analogue selector switch $S_1$ to $S_4$, and the measuring coil/switch pairs are arranged in parallel with one another and in series with the reference inductance $L_{ref}$. The advantages of this arrangement are that, again, only one measuring comparator COMP M is required, and that single pole switches instead of double pole switches are used. In this circuit, as compared with the circuit of FIGS. 3 and 4, the measuring coils $L_1$ to $L_4$ are only connected to the A.C. amplifier during the period for which phase measurements are being made. This further minimises any possibility of mutual disturbances between the measuring coils.

We claim:

1. A displacement measuring transducer for measuring the displacement of a monitored object comprising a coil, an A.C. source connected to said coil, a core assembly fixedly associated with said monitored object and which is axially movable relative to said coil, said core assembly comprising a short-circuit turn and a magnetic flux concentrator arranged to enhance the flux linkage between said short-circuit turn and said coil, and measuring means connected to said coil for measuring changes in the phase relationship between the voltage and current in said coil, said core assembly being so arranged that on increasing penetration of said core assembly into said coil the inductance of said coil increases and the reflected shunt resistance across said coil decreases to provide said changes in said phase relationship.

2. A transducer as claimed in claim 1 wherein a single member acts both as said flux concentrator and as said short-circuit turn.

3. A transducer as claimed in claim 2 wherein said member is formed of mild steel.

4. A transducer as claimed in claim 1 wherein the resistance of said short-circuit turn is chosen such that said changes in said phase relationship are substantially maximised.

5. A transducer as claimed in claim 1 wherein said short-circuit turn comprises a layer of relatively electrically conductive material which is provided on the outer surface of a member acting as said flux concentrator.

6. A system for measuring the displacements of a plurality of monitored objects, comprising a respective core assembly fixedly associated with each of said monitored objects, and a respective coil, each core assembly comprising a respective short-circuit turn and a respective magnetic flux concentrator arranged to enhance the flux linkage between each said coil and the respective short-circuit turn each said core assembly being axially movable relative to the respective coil, and each said core assembly being so arranged that on increasing penetration of said core assembly into the respective coil the inductance of said coil increases and the reflected shunt resistance across said coil decreases to provide changes in the phase relationship between the voltage and current in said coil, a series electrical circuit comprising said coils and series electrical connections between said coils, an A.C. source connected in series with said series electrical circuit, and measuring means connected to each said coil for measuring changes in said phase relationship in each coil.

7. A vehicle suspension assembly comprising first attachment means for connection to a sprung member of a vehicle, second attachment means for connection to an un-sprung member of the vehicle, a first part associated with said first attachment means, a second part associated with said second attachment means, said first and second parts being movable relative to each other on expansion and contraction of the assembly, a coil mounted on one of said parts, and a core assembly associated with the other of said parts, whereby said core assembly moves axially relative to said coil on expansion and contraction of the assembly, an A.C. source connected to said coil, said core assembly comprising a short-circuit turn and a magnetic flux concentrator arranged to enhance the flux linkage between said short-circuit turn and said coil, and measuring means connected to said coil for measuring changes in the phase relationship between the voltage and current in said coil, said core assembly being so arranged that on increasing penetration of said core assembly into said coil the inductance of said coil increases and the reflected shunt resistance across said coil decreases to provide said changes in said phase relationship.

8. A vehicle suspension assembly as claimed in claim 7 and comprising a piston and cylinder, an end of said cylinder, a piston rod connected to said piston and extending through said cylinder end, a first connection between said piston rod and one of said attachment means, a second connection between said cylinder and the other of said attachment means, said coil being mounted coaxially and radially outwardly of said cylinder and fixed relative to said piston rod, and said short-circuit turn being associated with said cylinder.

9. A vehicle suspension assembly as claimed in claim 8 wherein said cylinder comprises a cylinder body provided in the region of said coil with a surface layer of material of greater electrical conductivity than that of the material of said cylinder body, whereby said surface layer acts as said short-circuit turn.

10. A vehicle suspension assembly as claimed in claim 9 in which said surface layer is provided by or on a sleeve which is secured on said cylinder body.

11. A vehicle suspension assembly as claimed in claim 8 wherein said coil is mounted on a cylindrical plastics dirt-shield coaxial with said cylinder.

12. A vehicle suspension system comprising a plurality of suspension assemblies, each as claimed in claim 8, a common A.C. source arranged to energise the coils of each suspension assembly, a common phase measuring detector arranged to measure changes of phase in the voltage/current relationship of the coils, and a multiplex switch assembly arranged such that the phase measuring detector analyses in sequence the phase relationship of the measuring coils.

13. A vehicle suspension assembly as claimed in claim 8 wherein said cylinder end acts both as said flux-concentrator and as said short-circuit turn, and said coil is positioned axially of said piston rod whereby the penetration of said cylinder end into said coil varies with expansion and contraction of said assembly.

14. A vehicle suspension system comprising a plurality of suspension assemblies each as claimed in claim 7, a respective transducer associated with each suspension assembly to detect the height of the assembly, each transducer being arranged to provide a height signal which varies progressively with displacements of the respective suspension assembly, and a multiplex switch assembly connected between the transducers and a signal analysis circuit which is arranged sequentially to analyse the height signals from the different transducers.

* * * * *